July 24, 1951   J. J. PARKER ET AL   2,561,534
GAUGE FOR CHECKING TOOTHED MACHINE ELEMENTS,
SUCH AS GEARS AND SPLINES
Filed Nov. 29, 1948   3 Sheets-Sheet 1
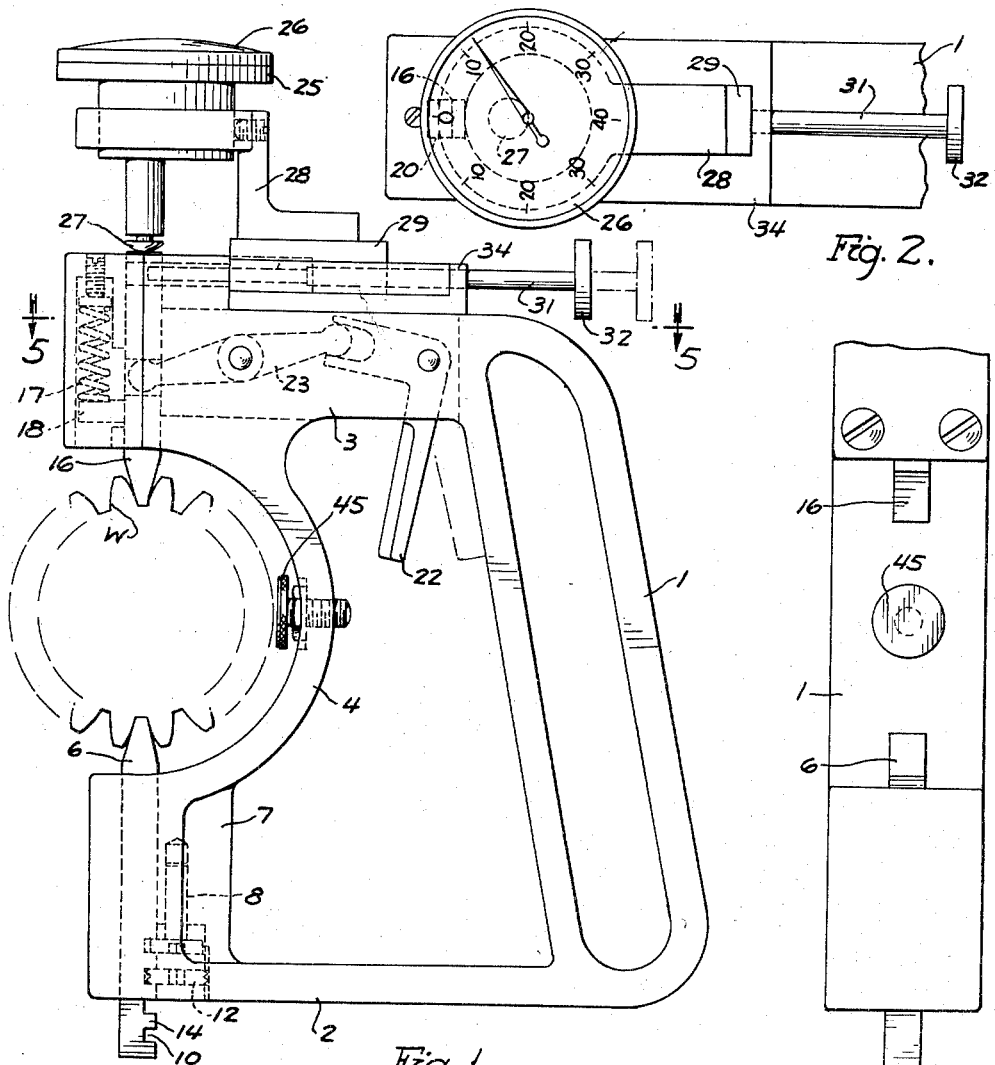
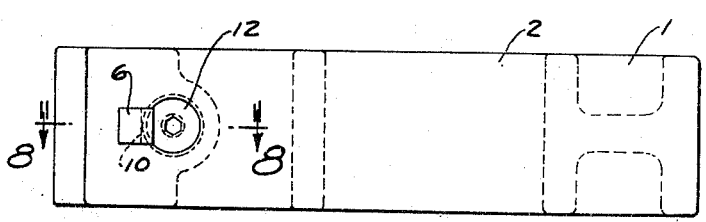
INVENTORS
John J. Parker &
London T. Morawski
BY
Barnes, Kisselle, Laughlin & Raisch
ATTORNEYS.

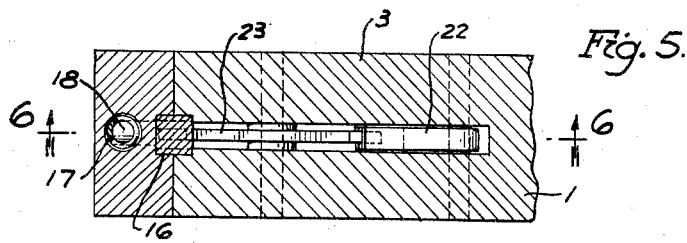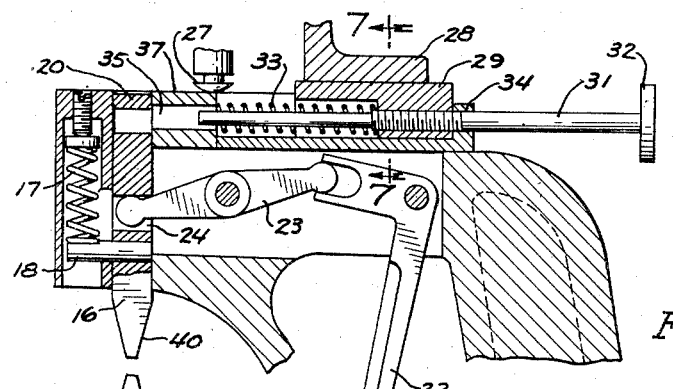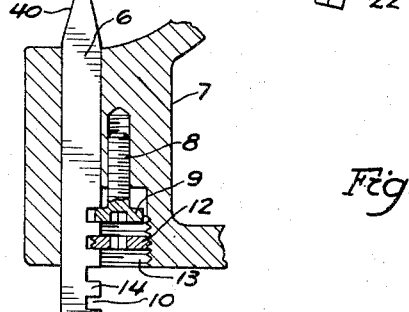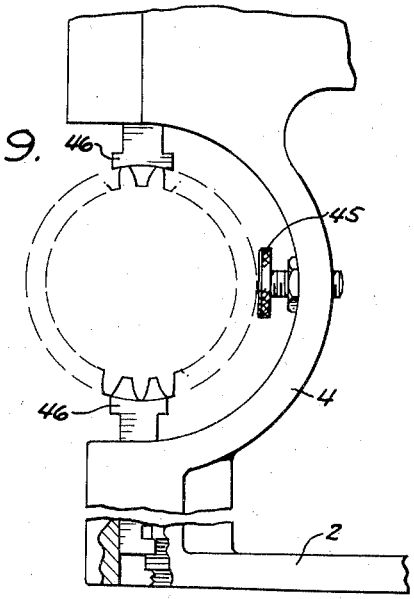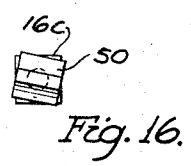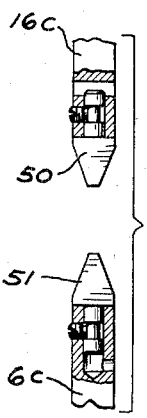

July 24, 1951   J. J. PARKER ET AL   2,561,534
GAUGE FOR CHECKING TOOTHED MACHINE ELEMENTS,
SUCH AS GEARS AND SPLINES
Filed Nov. 29, 1948                    3 Sheets-Sheet 3
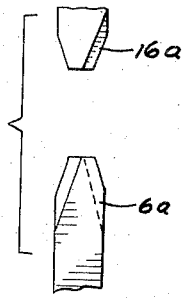
Fig. 14.   Fig. 11.
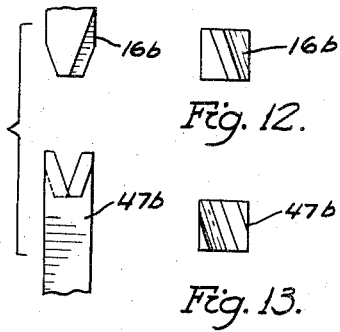
Fig. 12.
Fig. 13.
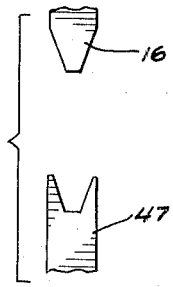
Fig. 10.
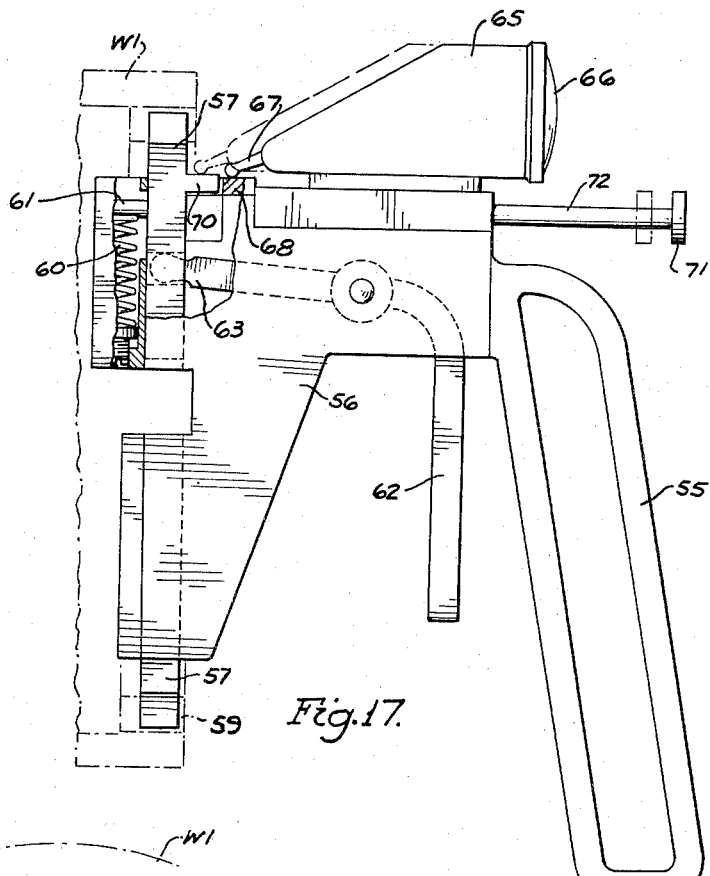
Fig. 17.
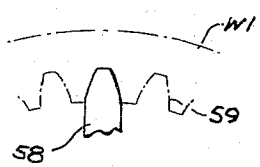
Fig. 18.
INVENTORS
John J. Parker &
London T. Morawski
BY
Barnes, Kisselle, Laughlin & Raisch
ATTORNEYS.

Patented July 24, 1951

2,561,534

UNITED STATES PATENT OFFICE 2,561,534

GAUGE FOR CHECKING TOOTHED MACHINE ELEMENTS, SUCH AS GEARS AND SPLINES

John J. Parker and London T. Morawski, Detroit, Mich.

Application November 29, 1948, Serial No. 62,532

5 Claims. (Cl. 33—147)

This invention relates to a gauge for checking machine elements such as gears or splined elements, and has to do particularly with a device for gauging the machine elements while they may be held in the machine which is performing operations thereon.

The general purpose of this invention is to provide a gauge structure which may be used for checking machine elements, such as gears without the necessity of removing the element from where it is mounted. An improved gauge structure is provided for checking such elements for size and particularly for checking the tooth formation. While the gauge may be used for checking a machine element while it is mounted in a machine for the performance of machine operation thereon, the gauge may be otherwise employed for checking elements which are not so held, and the gauge structure is also useful, and may be especially arranged to not only check the tooth formation, but also the outside diameter of machine elements and for checking elements with helical teeth. A gauge constructed in accordance with the invention may be so arranged as to check machine elements with external and internal teeth.

Another purpose of this invention is to provide a gauge, for checking gears, splines and the like, which simplifies the mathematical calculations for determining tooth-sized dimensions. Heretofore, accurate tooth-size figures made mandatory the use of involute trigonometric functions. The use of this gauge simplifies the calculation to just a mere addition and subtraction.

Gauges made in accordance with the invention are shown in the accompanying drawings:

Fig. 1 is a side elevational view of a gauge tool constructed in accordance with the invention showing the same applied to a work piece.

Fig. 2 is a top plan view.

Fig. 3 is a front end view looking from the left of Fig. 1.

Fig. 4 is a bottom view of the gauge tool shown in Fig. 1.

Fig. 5 is a sectional view taken substantially on line 5—5 of Fig. 1 showing some of the articulating parts.

Fig. 6 is a sectional view taken substantially on line 6—6 of Fig. 5 showing articulating parts.

Fig. 7 is a sectional view taken on line 7—7 of Fig. 6 showing the mounting of the gauge element.

Fig. 8 is a sectional view taken on line 8—8 of Fig. 4 showing the mounting of one of the gauging fingers.

Fig. 9 is a view illustrating gauging fingers for gauging the outside diameter of a work piece.

Fig. 10 is a diagrammatic view illustrating gauging fingers for use with a toothed element with an odd number of teeth.

Fig. 11 is a diagrammatic view illustrating gauging fingers for a work piece having an odd number of helical teeth.

Fig. 12 is an end view of one of the fingers shown in Fig. 11.

Fig. 13 is an end view of another finger shown in Fig. 11.

Fig. 14 is a diagrammatic view of fingers for gauging work pieces with helical teeth.

Fig. 15 is a view of another form of gauging fingers for gauging helical teeth.

Fig. 16 is an end view of one of the fingers shown in Fig. 15.

Fig. 17 is a side elevational view with some parts cut away and some parts in section showing a tool for gauging a work piece with internal teeth.

Fig. 18 is a detailed view illustrating a form of gauge finger usable with the tool shown in Fig. 17.

In Fig. 1 a tool is shown having a handle portion 1 with a lower arm 2 projecting therefrom and an upper arm 3 projecting therefrom. The ends of the arms 2 and 3 are preferably connected as by means of a curved or semi-circular part 4 which is adapted to receive the work piece. The work piece W shown in Fig. 1 may be considered a gear and for convenience and brevity, reference will hereinafter be made to the work piece as a gear, although other toothed or splined elements may be gauged.

There are two opposite gauging fingers. One gauging finger, as shown at 6, is relatively fixed and mounted in a post 7. This finger as shown in Fig. 8 may be held fixedly in position by a binding screw 8 threaded into the post 7 and having a head 9 engageable in one of several slots 10 in the finger. Another binding screw 12 is threaded in a recess 13 in the post and it engages in another of the slots in the finger. The head 9 of the screw 8 freely turns in the recess 13 and the member 12 has an aperture therethrough, as indicated, so that a tool may be passed therethrough for engaging a recess in the head 9 for the turning of the same. It will be seen that by relatively manipulating the two screw threaded elements that the finger 6 may be adjusted lengthwise and may also be securely locked in adjusted position as the threaded elements are caused to bind against an intervening projection 14. The finger 6 is generally adjustable by engaging the threaded elements in selected notches 10.

The opposite gauging finger 16 is slidably mounted in the arm 3 and is strongly spring pressed toward the finger 6 by a coil spring 17 which engages a pin 18 attached to the finger. This finger has a top gauging surface 20. The finger may be retracted as by means of a finger piece or trigger 22 which is pivotally mounted as shown and engages a rocker arm 23 at one end while the other end of the rocker arm is situated in a slot 24 of the finger. The trigger and the rocker arm are concealed as by being mounted in a slot in the arm 3 as shown in Fig. 5, and it will be appreciated that by grasping the handle 1, and by rocking the trigger 22 how the gauge 16 may be shifted against the action of the spring 17.

There is an indicator 25 having a suitable dial 26 and actuating piece 27 which is carried by bracket 28 in turn mounted on a block 29 slidably mounted in ways in the arm 3. Attached to the block is a plunger 31 with a finger piece 32. A coil spring 33 is positioned in a recess formed in the arm 3 and serves to hold the block in the position shown in Fig. 6 with the block abutting against a shoulder 34. The plunger 31 has an inner end which extends through the spring to guide the same and the arm 3 and the finger 6 have drilled openings therein to form a passage 35 for accommodating the plunger. The top of the arm 3 has an indicator setting surface 37 upon which the actuator 27 is adapted to rest and slide.

The fingers 6 and 16, especially when arranged to gauge involute teeth, have inclined end surfaces 40 so that the fingers narrow down at their ends and preferably the fingers have the formation of a basic rack tooth. By using the basic rack tooth formation as indicated, the gauging fingers may be used on gears of different sizes but which are of the same pitch and pressure angle.

The normal position of the parts are as shown in Fig. 6 and to use the tool the same is grasped by its handle 1 and the operator retracts the finger 16 by swinging the trigger 22. With the finger 16 retracted away from the finger 6 the tool may be applied to the gear as shown in Fig. 1. In the applied position the fingers engage in opposite spaces between gear teeth as indicated.

The instrument is set up and adjusted so that when the indicator actuator 27 rests upon the surface 37 the reading of the indicator is zero. The spacing between the two gauging fingers, when they are in a theoretically perfect position as when they are gauging a perfect gear, is equal to the pitch diameter of the gear less two addendum. When the two gauging fingers enter the spaces between two gear teeth, the two apices of the gauging fingers enter said spaces to an extent equal to the tooth of a mating gear, if, of course, the space is perfect and the reading is zero. The fingers, when constructed as above noted, and embodying the basic rack tooth formation, contact the teeth of the work at the pressure angle which is in the vicinity of the pitch line. With the tool thus applied as shown in Fig. 1, the operator, by engaging the button 32, pushes the slide 29 against the action of the spring 33 and the indicator actuator 27 slides over the surface 20. If the gear is perfect, the surface 20 will be in accurate alignment with the surface 27 and the gauge will read zero. If the gauge has a minus reading, it will at once be known that the space is too large and the gauging fingers have entered too far into the spaces. The minus reading in this case indicates that the teeth between the spaces are too small. If the reading is plus, it will be known that the teeth are too large. The removal of the tool is by a manipulation reverse to that above described.

The recessed member 4 is preferably of such size as to accommodate a number of sizes of gears and when it is known that the instrument is to be used from time to time on the same size gear a screw threaded button 45 may be adjusted so as to substantially contact with the periphery of a work piece to thus aid in quickly locating the fingers in diametrically opposite spaces.

In the form shown in Fig. 9, the outside diameter of a work piece may be gauged. The tool is otherwise the same as above described but the gauging fingers have heads 46 of such circumferential extent as to bridge two teeth. As shown, a gear may be gauged with an odd number of teeth, inasmuch as the heads of the fingers are capable of bridging at least two teeth.

For gauging a gear or other toothed element with an odd number of teeth, gauging fingers as shown in Fig. 10 may be used. This comprises a gauge finger such as the finger 16 and a female gauging finger 47 for engaging over a tooth. Where a toothed element with helical teeth is encountered the gauging fingers may have their end portions angularly or helically disposed as shown at 16a and 6a in Fig. 14. If helical or angular teeth of an odd number are encountered one helical male finger and one helical female finger may be employed as shown in Figs. 11, 12 and 13 and as indicated at 16b and 47b.

Fingers of the type which may be used with straight gear teeth or helical gear teeth of different angles are illustrated in Figs. 15 and 16. Here the fingers 6b and 16b are provided each with a swiveled end piece 50 and 51 capable of angular adjustment. A swiveled position of the end piece 50 is illustrated in Fig. 16.

An instrument for use with an internal gear is illustrated in Fig. 17. This instrument has an handle portion 55 with a body 56 for holding a relatively fixed gauging finger 57 and a movable gauging finger 58. The work piece is shown at W' with internal teeth 59. The finger 58 is urged outwardly by a spring 60 which acts upon a projecting abutment or pin 61 and a lever or trigger 62, which is pivotally mounted as indicated, has an end portion 63 engaged in a notch or slot in the finger 58 so that the finger 58 may be retracted inwardly. To apply the tool to the work the finger 58 retracted, the tool is inserted into the internal gear and then the lever released to engaged position as indicated. The gauge 65 is slidably mounted and it has a dial 66 with an actuating finger 67 arranged to slide upon the surface 68 of the body portion 56 and arranged to be projected to the dotted line position with the actuator sliding over the surface of a projection 70 on the finger 58.

The gauging element may be pushed to the dotted line position by pressure on the finger piece or button 71 attached to the rod 72. Various details of construction are not shown in Fig. 17 as these features may be substantially the same as those previously described. However, since the internal teeth are differently shaped from external teeth the teeth on the gauging fingers cannot employ the basic rack formation. Where the internal teeth on the work piece, as shown in Fig. 18, are of the involute type the formation of the gauging finger 58 may be and probably is of the involute type to thus fit in the space between two adjacent teeth. Needless to say, the formation of the finger 57 may be the same.

It will be appreciated how a work piece, such as the gear shown in Fig. 1, may remain held in position in a machine which is performing work thereon and the instrument of this invention may be carried to the work piece and applied thereto for gauging the same. The instrument shown in Fig. 17 may be similarly applied to a work piece while held in a machine. As above explained, however, the gauging instrument of the present invention may find use and can be used on work pieces which are not held in position but which may be, to the contrary, moved to the gauging instrument.

We claim:

1. An instrument for gauging a toothed work piece, such as a gear, comprising, a body, a first gauging finger mounted relatively fixed in the body, a second gauging finger slidably mounted in the body, said gauging fingers being substantially oppositely disposed, yieldable means acting on the second gauging finger, means for shifting the second gauging finger relative to the first gauging finger for the application of and removal of the fingers to and from a work piece, an indicator having an actuating element, means slidably mounting the indicator on the body for movement in a direction perpendicular to the fingers, the body having a surface engaged by and along which the actuating element moves, the second gauging finger having a gauging surface over which the said actuating element is adapted to be shifted upon movement of the indicator to thereby indicate the position of the second gauging finger and the condition of the work piece.

2. An instrument for gauging a toothed work piece, such as a gear, comprising, a body, a first gauging finger mounted relatively fixed in the body, a second gauging finger slidably mounted in the body, said gauging fingers being substantially oppositely disposed, yieldable means acting on the second gauging finger, means for shifting the second gauging finger relative to the first gauging finger for the application of and removal of the fingers to and from a work piece, an indicator having an actuating element, means slidably mounting the indicator on the body for movement in a path perpendicular to the gauging fingers, the body having a flat surface which the actuator element engages and along which the actuator element slides as the indicator is shifted, the second gauging finger having a gauging surface over which the actuating element is adapted to slide to thereby indicate the position of the second gauging finger and the condition of the work piece.

3. An instrument for gauging a toothed work piece, such as a gear, comprising, a body, a first gauging finger mounted relatively fixed in the body, a second gauging finger slidably mounted in the body, said gauging fingers being substantially oppositely disposed, yieldable means acting on the second gauging finger, means for shifting the second gauging finger relative to the first gauging finger for the application of and removal of the fingers to and from a work piece, an indicator having an actuating element, means movably mounting the indicator on the body, the body having a surface engaged by and along which the actuating element moves, the second gauging finger having a gauging surface over which the said actuating element is adapted to be shifted upon movement of the indicator to thereby indicate the position of the second gauging finger and the condition of the work piece, said gauging fingers having gauging heads of basic rack tooth formation for engaging in the spaces between teeth of the work piece.

4. An instrument for gauging a toothed work piece, such as a gear, comprising, a body, a first gauging finger mounted relatively fixed in the body, a second gauging finger slidably mounted in the body, said gauging fingers being substantially oppositely disposed, yieldable means acting on the second gauging finger, means for shifting the second gauging finger relative to the first gauging finger for the application of and removal of the fingers to and from a work piece, an indicator having an actuating element, means slidably mounting the indicator on the body for movement in a path perpendicular to the gauging fingers, the body having a surface engaged by and along which the actuating element moves, the second gauging finger having a gauging surface over which the said actuating element is adapted to be shifted upon movement of the indicator to thereby indicate the position of the second gauging finger and the condition of the work piece, and means for adjustably mounting the first gauging finger in its relatively fixed position for the accommodation of work pieces of different sizes.

5. An instrument for gauging a toothed work piece, such as a gear, comprising a body having a handle portion and two spaced arms, a first gauging finger mounted in one arm, a second gauging finger slidably mounted in the other arm with the gauging fingers substantially opposite each other, a spring normally urging the second gauging finger toward the first gauging finger, a trigger operable to retract the second gauging finger against the spring for the insertion and removal of a work piece between the gauging fingers, an indicator having an actuating element, means slidably mounting the indicator on the body for movement in a path perpendicular to the gauging fingers, the body and the second gauging finger having surfaces arranged for sliding contact with the said actuating element, a spring for holding the indicator so that the actuating element is normally removed from the second gauging finger, and an element engageable for slidably shifting the indicator to shift its actuating element onto the surface of the second gauging finger, whereby to indicate the position of the second gauging finger and the condition of the work piece.

JOHN J. PARKER.
LONDON T. MORAWSKI.

REFERENCES CITED

The following references are of record in the file of this patent:

UNITED STATES PATENTS

| Number | Name | Date |
|---|---|---|
| 1,336,189 | Bechler | Apr. 6, 1920 |
| 1,384,710 | Morell | July 12, 1921 |
| 1,392,313 | Fallow | Oct. 4, 1921 |
| 1,473,748 | Trosky et al. | Nov. 13, 1923 |
| 1,478,954 | Hardaker | Dec. 25, 1923 |
| 1,579,108 | Harter | Mar. 30, 1926 |
| 1,863,673 | Schraven | June 21, 1932 |
| 1,879,559 | Smart | Sept. 27, 1932 |
| 2,032,856 | Steiner | Mar. 3, 1936 |

FOREIGN PATENTS

| Number | Country | Date |
|---|---|---|
| 651,226 | France | Oct. 8, 1928 |

OTHER REFERENCES

Publ.: American Machinist Magazine; February 14, 1946, page 130.